(12) United States Patent
Akasaka

(10) Patent No.: US 12,074,690 B2
(45) Date of Patent: Aug. 27, 2024

(54) OPTICAL SIGNAL POWER GAIN

(71) Applicant: Fujitsu Limited, Kawasaki (JP)

(72) Inventor: Youichi Akasaka, Plano, TX (US)

(73) Assignee: FUJITSU LIMITED, Kawasaki (JP)

( * ) Notice: Subject to any disclaimer, the term of this patent is extended or adjusted under 35 U.S.C. 154(b) by 110 days.

(21) Appl. No.: 17/991,687

(22) Filed: Nov. 21, 2022

(65) Prior Publication Data

US 2024/0171297 A1 May 23, 2024

(51) Int. Cl.
*H04J 14/02* (2006.01)

(52) U.S. Cl.
CPC ................. *H04J 14/0221* (2013.01)

(58) Field of Classification Search
CPC .................................................. H04J 14/0221
See application file for complete search history.

(56) References Cited

U.S. PATENT DOCUMENTS

| 2006/0061853 A1* | 3/2006 | Chraplyvy | G02F 1/353 |
| | | | 359/330 |
| 2011/0176202 A1* | 7/2011 | Kato | H01S 3/0057 |
| | | | 359/345 |
| 2017/0272171 A1* | 9/2017 | Almaiman | H04B 10/2916 |

OTHER PUBLICATIONS

J. Wang et al., "All-optical 2R regeneration of a 160-Gbit/s RZOOK serial data signal using a FOPA," IEEE Photonics Conference 2012, Burlingame, CA, USA, 2012, pp. 108-109, doi: 10.1109/IPCon.2012.6358512. (Year: 2012).*

* cited by examiner

*Primary Examiner* — Nathan M Cors
(74) *Attorney, Agent, or Firm* — Maschoff Brennan

(57) ABSTRACT

An optical device may include a non-linear optical medium and an optical coupler coupled to the optical medium. The optical coupler may be configured to multiplex an optical data signal and an optical pump signal onto the optical medium such that an optical idler signal is generated. The power of the optical pump signal may be below a level that results in optical parametric amplification of the optical idler signal. The optical device may further include an amplifier coupled to the optical medium and configured to amplify the optical data signal.

20 Claims, 6 Drawing Sheets

OPTICAL SIGNAL POWER GAIN

FIELD

The embodiments discussed in the present disclosure are related to optical signal power gain.

BACKGROUND

An optical network may use optical signals to transmit data between a transmitter and a receiver. The optical signals may be transmitted along optical fibers. As optical signals traverse optical fibers, a power level of the optical signals may decrease. As such, optical signals are typically amplified before transmission. Additionally, to maintain an optical signal to noise ratio above a particular threshold, the optical signal may be re-amplified after transmission over a particular distance.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

In an example embodiment, an optical device may include a non-linear optical medium and an optical coupler coupled to the optical medium. The optical coupler may be configured to multiplex an optical data signal and an optical pump signal onto the optical medium such that an optical idler signal is generated. The power of the optical pump signal may be below a level that results in optical parametric amplification of the optical idler signal. The optical device may further include an amplifier coupled to the optical medium and configured to amplify the optical data signal.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Optical networks are used to transmit data from a transmitter to a receiver and demand for data transmission has continued to increase. To help meet this demand, higher level modulation formats have been developed and deployed. However, the higher-level modulation formats may have a higher optical signal to noise ratio (OSNR) requirement than other lower-level modulation formats. Some systems are able to support the higher OSNR requirements. However, due to degradation of optical signal power during transmission of optical signals, to maintain a higher OSNR for an optical signal, the optical signal may not be able to be transmitted as far as when the optical signal used a lower-level modulation format with a lower OSNR requirement.

A typical optical amplifier may not help remedy the problem of the higher OSNR requirement because a typical optical amplifier may add additional noise to an optical signal when amplifying the optical signal resulting in an OSNR that may be acceptable for higher-level modulation formats.

Some embodiments in this disclosure may relate to an optical gain system that may be configured to provide a gain to an optical signal with no noise or increasing the lower noise in the optical signal. By providing the gain with no noise or lower noise, the OSNR degradation of the optical signal may be suppressed compared to amplification. With a higher OSNR, a typical amplifier may be used to amplify the optical signal. The degradation of the OSNR of the amplified optical signal due to the amplification may be offset by a previous increase in the OSNR such that the amplified optical signal may maintain an acceptable OSNR.

In some embodiments, the optical gain system as provided in this disclosure may use wavelength exchange to suppress degradation of the OSNR of an optical signal by providing gain to the optical signal without providing any or a relatively small amount of noise. The wavelength exchange may occur by multiplexing an optical signal with a pump signal onto a non-linear optical medium to generate an idler signal. The pump signal may have a power level lower than the power level of the optical signal so that optical parametric amplification of the idler signal does not occur and little to no noise is generated by the wavelength exchange and added to the optical signal. As such, degradation of the OSNR of the optical signal may be suppressed before amplification and maintained after amplification.

Figure 1:
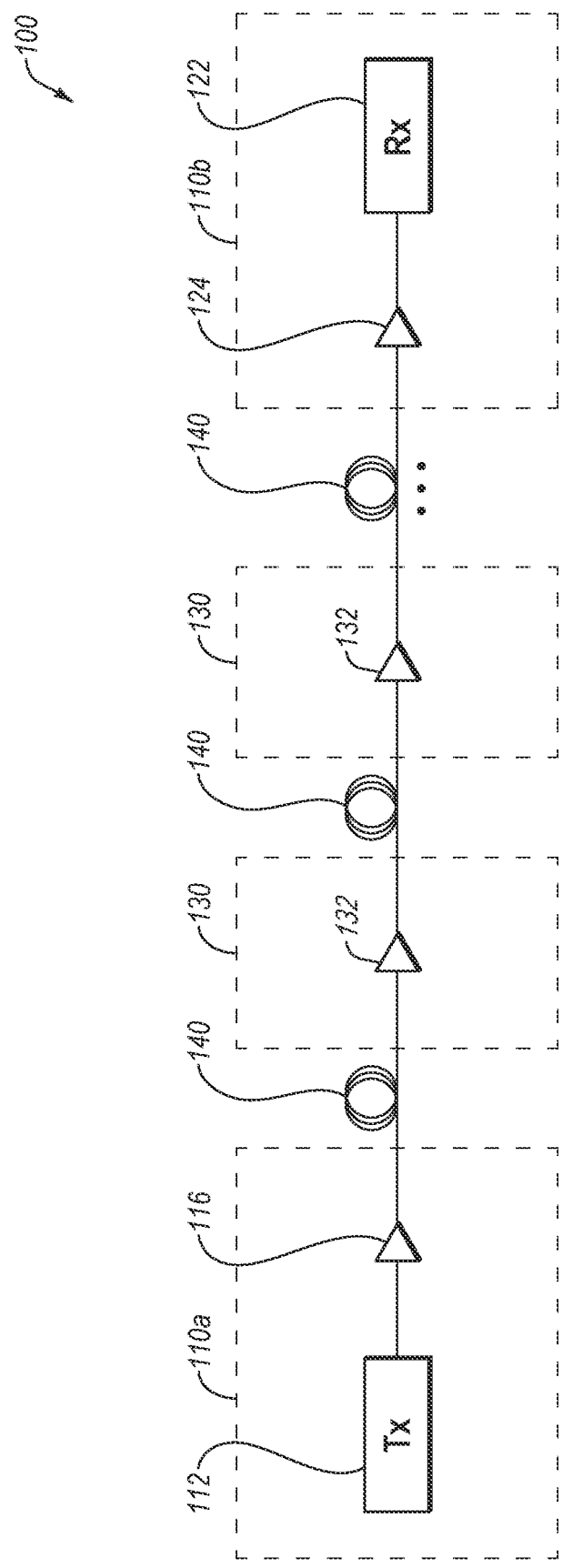
FIG. 1 illustrates a block diagram of an example optical network.

Turning to the figures, FIG. 1 is a block diagram of an example optical network 100, arranged in accordance with at least some embodiments described herein. The optical network 100 may include an optical fiber 140 configured to transport one or more optical signals communicated by components of the optical network 100. The components of the optical network 100, coupled by the optical fiber 140, may include terminal nodes 110a, 110b and optical nodes 130. Although the optical network 100 is illustrated as a point-to-point optical network with terminal nodes 110a, 110b, the optical network 100 may be configured as a ring optical network, a mesh optical network, or any other optical network or combination of networks. The optical network 100 may be used as a short-haul network, a long-haul network, or any other optical network or combination of optical networks. The optical fiber 140 may include any suitable type of optical fiber, such as, Single-Mode Fiber (SMF), Enhanced Large Effective Area Fiber (E-LEAF), Dispersion Compensating Fiber (DCF), Multi-Mode Fiber (MMF), among others, as well as combinations thereof.

The terminal node 110a may include a transceiver 112 and an optical gain system 116. The transceivers 112 may include any type of transceiver configured to modulate an optical signal to encode data thereon and transmit the optical signal within the optical network 100. The optical gain system 116 may be configured to increase a signal power of the optical signal. The optical gain system 116 may be configured to increase the signal power of the optical signal using one or more wavelength exchange devices, an amplification device, or a combination of one or more wavelength exchange devices and an amplification device.

In some embodiments, the amplification device may be configured to apply an amplification to the optical signal. The amplification applied to the optical signal may increase the power of the optical signal and the power of the noise level of the optical signal.

In some embodiments, a wavelength exchange device may apply a wavelength exchange power gain to the optical signal. The wavelength exchange power gain may be applied to the optical signal with limited or no increase in the power of the noise floor of the optical signal. For example, a wavelength exchange device may obtain an optical signal with a signal power of −20 dBm and may increase the power of the optical signal by 2.5 dB with limited or no increase in the power of the noise floor. Because the wavelength exchange device may increase the power of the optical signal with limited increase in the power of the noise floor, the wavelength exchange device may increase an optical to signal noise ratio (OSNR) of the optical signal.

In some embodiments, the optical gain system 116 may include multiple wavelength exchange devices. In these and other embodiments, the wavelength exchange devices may be arranged in a cascading format such that the output of one wavelength exchange device is provided to the input of another wavelength exchange device. In these and other embodiments, each of the wavelength exchange devices may apply a power gain to the optical signal. A number of wavelength exchange devices that are cascaded in the amplifier system may be selected based on a desired increase to the power of the optical signal or a desired increase of the OSNR of the optical signal. For example, the number of wavelength exchange devices that are cascaded may be based on an amplification applied by the amplification device to the optical signal. For example, an amount of amplification applied by the amplification device may result in a noise level gain. A number of wavelength exchange devices may be selected such that the sum of the power gain applied by the wavelength exchange devices is greater than the noise level gain resulting from the amplification applied by the amplification device.

As a result, the amplification applied by the amplification device may not result in degradation of the OSNR of the optical signal. Thus, applying the optical gain system 116 at appropriate intervals may result in an optical signal being able to be transmitted any distance even when the optical signal has a higher OSNR requirement, such as when the optical signal has a higher-level modulation format.

The optical nodes 130 may include an optical gain system 132. The optical gain system 132 may be similar to the optical gain system 116 and may be configured to increase a signal power of the optical signal.

The terminal node 110b may include a transceiver 122 and an optical gain system 124. The optical gain system 124 may be similar to the optical gain system 116 and may be configured to increase a signal power of the optical signal. The transceiver 122 may be any type of transceiver configured to receive the optical signal and to demodulate it into an electrical signal. In some embodiments, the transceiver 122 may be a coherent receiver that includes digital signal processing.

Modifications, additions, or omissions may be made to the optical network 100 without departing from the scope of the present disclosure. For example, in some embodiments, the optical network 100 may include more or less than two optical nodes 130. Alternately or additionally, the optical nodes 130 may include components other than those illustrated in FIG. 1. Furthermore, in some embodiments, the terminal nodes 110a, 110b may include components other than those illustrated in FIG. 1. Alternately or additionally, the terminal nodes 110a, 110b may both be configured to receive and transmit optical signals over the optical network 100.

Figure 2:
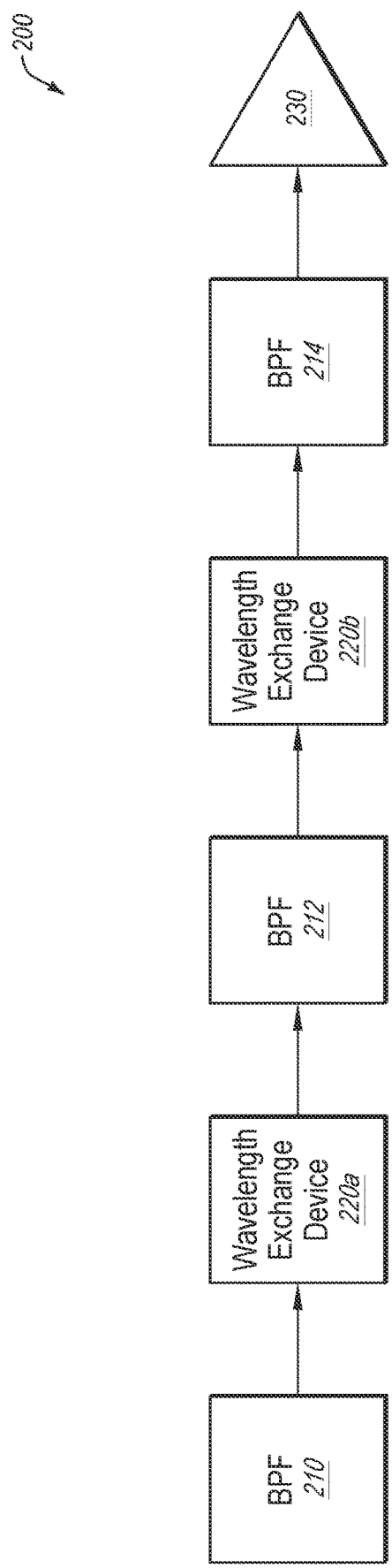
FIG. 2 illustrates an example optical gain system.

FIG. 2 illustrates an example optical gain system 200, according to at least one embodiment in the present disclosure. The optical gain system 200 may include a first bandpass filter 210, a second bandpass filter 212, a third bandpass filter 214, a first wavelength exchange device 220a and a second wavelength exchange device 220b, referred to collectively as the wavelength exchange devices 220, and an amplification device 230.

In some embodiments, the first bandpass filter 210 may be configured to obtain an optical signal, such as an optical signal in an optical network, such as the optical network 100 of FIG. 1. The optical signal may be any type of optical signal with any modulation scheme. The first bandpass filter 210 may be configured to filter one or more wavelengths of the optical spectrum and allow one or more wavelengths of the optical spectrum to pass through the first bandpass filter 210 without filtering. In these and other embodiments, the first bandpass filter 210 may be configured to pass a wavelength of the optical signal. In these and other embodiments, the first bandpass filter 210 may be configured to filter a wavelength of an idle optical signal that may be generated by the first wavelength exchange device 220a. As such, the first bandpass filter 210 may be configured to remove noise from the wavelength of the idle optical signal. The first bandpass filter 210 may be configured to provide the optical signal with the filtering applied to the first wavelength exchange device 220a.

In some embodiments, the first wavelength exchange device 220a may be coupled to the output of the first bandpass filter 210 and may be configured to obtain the optical signal from the first bandpass filter 210. The first wavelength exchange device 220a may be configured to apply a gain to the optical signal. The first wavelength exchange device 220a may apply the gain to the optical signal without applying a gain or a limited gain to a noise floor of the optical signal. As a result, the OSNR ratio of the optical signal may be increased by the first wavelength exchange device 220a as compared to the OSNR ratio of the optical signal when amplified by optical amplifiers. In some embodiments, an amount of the gain applied to the optical signal may be variable.

In some embodiments, the first wavelength exchange device 220a may be configured to apply the gain to the optical signal using a process. The process may include multiplexing the optical signal and an optical pump signal onto a non-linear optical medium. As a result, an idler optical signal may be generated. The idler optical signal may be a sideband signal generated by a nonlinear phase modulation caused by multiplexing the optical signal and an optical pump signal onto the non-linear optical medium. The idler optical signal may be related to the optical signal and the optical pump signal as explained with respect to FIG. 3b. In these and other embodiments, a sub-idler optical signal may also be generated that may have a wavelength of the optical signal and may constructively interfere with the optical signal to apply a gain to the optical signal. This process may be referred to as wavelength exchange. As such, a gain may be applied to the optical signal without or with limited gain being applied to the noise floor of the optical signal. In these and other embodiments, the amount of the gain applied to the optical signal may be adjusted by adjusting a power of the optical pump signal multiplexed with the optical signal. The first wavelength exchange device 220a may provide the optical signal with the applied gain to the second bandpass filter 212.

In some embodiments, the second bandpass filter 212 may be coupled to the wavelength exchange devices 220. In particular, an input of the second bandpass filter 212 may be coupled to the output of the first wavelength exchange devices 220a and an output of the second bandpass filter 212 may be coupled to an input of the second wavelength exchange device 220b. In these and other embodiments, the second bandpass filter 212 may be analogous to the first bandpass filter 210. For example, the second bandpass filter 212 may be configured to pass a wavelength of the optical signal and filter a wavelength of the idle optical signal that may be generated by the first wavelength exchange device 220a and an idle optical signal generated by the second wavelength exchange device 220b. As such, the second bandpass filter 212 may be configured to filter the idle optical signal generated by the first wavelength exchange device 220a and to remove noise from the wavelength of the idle optical signal generated by the second wavelength exchange device 220b. The second bandpass filter 212 may be configured to provide the optical signal with the filtering applied to the second wavelength exchange device 220b.

In some embodiments, the second wavelength exchange device 220b may be coupled to the output of the second bandpass filter 212 and may be configured to obtain the optical signal from the second bandpass filter 212. The second wavelength exchange device 220b may be configured to apply another gain to the optical signal in a manner analogous as the first wavelength exchange device 220a applies a gain to the optical signal. In some embodiments, an amount of the gain applied to the optical signal may be variable. In some embodiments, the second wavelength exchange device 220b may apply a gain that is the same as the gain applied by the first wavelength exchange device 220a. Alternately or additionally, the second wavelength exchange device 220b may apply a gain that is different than the gain applied by the first wavelength exchange device 220a. The second wavelength exchange device 220b may provide the optical signal with the applied gain to the third bandpass filter 214.

In some embodiments, the third bandpass filter 214 may be coupled to the second wavelength exchange device 220b and the amplification device 230. In particular, an input of the third bandpass filter 214 may be coupled to the output of the second wavelength exchange device 220b and an output of the third bandpass filter 214 may be coupled to an input of the amplification device 230. The third bandpass filter 214 may be analogous to the first bandpass filter 210 and the third bandpass filter 214. For example, the third bandpass filter 214 may be configured to pass a wavelength of the optical signal and filter a wavelength of the idle optical signal generated by the first wavelength exchange device 220a and an idle optical signal generated by the second wavelength exchange device 220b. As such, the third bandpass filter 214 may be configured to remove the idle optical signals. The third bandpass filter 214 may be configured to provide the optical signal with the filtering applied to the amplification device 230.

In some embodiments, the amplification device 230 may be coupled to the second wavelength exchange device 220b and may be configured to receive the optical signal from the second wavelength exchange device 220b. In these and other embodiments, the amplification device 230 may be configured to amplify the optical signal by applying a gain to a wavelength of the optical signal. The amount of gain applied to the optical signal may be variable. In these and other embodiments, the amplification device 230 may also apply a gain to the noise floor of the optical signal. As an example, the amplification device 230 may be an erbium-doped fiber amplifier configured to amplify a wavelength of the optical signal. Alternately or additionally, the amplification device 230 may be another type of optical amplifier. For example, the amplification device 230 may be a raman amplifier, semiconductor optical amplifier, rare earth doped fiber amplifiers, and/or optical parametric amplifier, among other types of amplifiers.

In some embodiments, the gain applied by the first wavelength exchange device 220a and the gain applied by the second wavelength exchange device 220b may be based on the noise level gain applied by the amplification device 230 to the optical signal. For example, the sum of the gains applied by the wavelength exchange devices 220 may be equal to or greater than the gain applied to the noise figure of the optical signal by the amplification device 230. In these and other embodiments, the noise figure may be defined as follows: noise figure (dB) equals a ratio of signal input OSNR (dB) divided by the signal output OSNR (dB). In these and other embodiments, the gains applied by each of the wavelength exchange devices 220 may be same or different, but the sum may be equal to or larger than the gain applied to the noise figure. In these and other embodiments, the gain applied by the wavelength exchange devices 220 may be adjusted to be as large as or larger than the gain applied to the noise figure by the amplification device 230.

In some embodiments, in response to a gain that may be applied to the optical signal by one of the wavelength exchange devices 220 being larger than the gain applied to the noise figure of the optical signal by the amplification device 230, the optical gain system 200 may not include the second wavelength exchange device 220b and the second bandpass filter 212.

Modifications, additions, or omissions may be made to the optical gain system 200 without departing from the scope of the present disclosure. For example, the optical gain system 200 may include additional wavelength exchange devices and bandpass filters. In these and other embodiments, for each additional wavelength exchange device, the optical gain system 200 may include an additional bandpass filter positioned before the wavelength exchange device. Alternately or additionally, the optical gain system 200 may include more additional wavelength exchange devices than bandpass filters.

In these and other embodiments, the number of additional wavelength exchange devices or the total number of wavelength exchange devices in the optical gain system 200 may be based on a gain applied by the amplification device 230. For example, the optical gain system 200 may be designed such that a sum of the gains applied by the wavelength exchange devices may be greater than the noise gain of the amplification device 230. For example, when the amplification device 230 includes a noise figure of 5 dB and a maximum gain of each of the wavelength exchange devices is 1.5 dB, four wavelength exchange devices may be cascaded so that the sum of the gains of the wavelength exchange devices is 6 dB and greater than the noise figure of 5 dB of the amplification device 230.

As another example, in some embodiments, the optical gain system 200 may not include the first bandpass filter 210 and the second bandpass filter 212. Alternately or additionally, the optical gain system 200 may include the first bandpass filter 210 and not the second bandpass filter 212 or vice versa. In these and other embodiments, the optical gain system 200 may eliminate or include the first bandpass filter 210 and/or the second bandpass filter 212 based on a difference between a sum of the gains of the wavelength exchange devices and the noise figure of the amplification device 230 as well as the noise level at the wavelength of the idle signal at the input of the first bandpass filter 210 and the wavelength exchange devices 220. For example, each wavelength exchange device may apply a gain of 2.5 dB and the noise figure of the amplification device 230 may be 3 dB. As such, two wavelength exchange devices may be used for a gain of 5 dB and an overhead of 2 dB. If the noise that may be generated by the wavelength exchange devices without filtering by the bandpass filters is less than the overhead of 2.5 dB, then the bandpass filters may not be used.

Figure 3A:
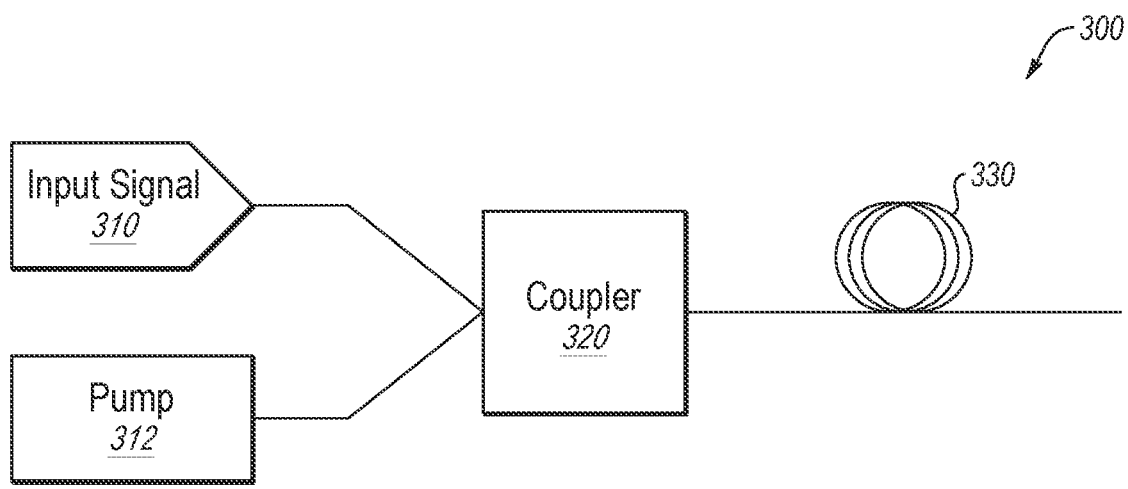
FIG. 3A illustrates an example wavelength exchange device.

FIG. 3A illustrates an example wavelength exchange device 300, according to at least one embodiment in the present disclosure. The wavelength exchange device 300 may include an optical pump 312, an optical coupler 320, and optical fiber 330. The wavelength exchange device 300 may be configured to obtain an optical input signal 310 and apply a gain to the optical input signal 310 without applying a gain or a limited gain to a noise floor of the optical input signal 310.

In some embodiments, the optical input signal 310 may be an optical data signal that may be obtained from another other device, such as an optical transmitter, optical fiber, or some other optical component that may be used in an optical network. As an example, the optical input signal 310 may be an optical signal from an optical network, such as the optical network 100 of FIG. 1. The optical input signal 310 may be provided to an input of the optical coupler 320.

In some embodiments, the optical pump 312 may be configured to generate an optical pump signal. Any type of optical pump may be used. The optical pump signal may be at a wavelength different than the wavelength of the optical input signal 310. The wavelength of the optical pump signal may be configured based on the wavelength of the optical input signal 310 to allow for the process of wavelength exchange to increase a gain of the optical input signal 310.

In some embodiments, the power level of the optical pump signal may be selected to achieve the power gain applied to the optical input signal 310 by the wavelength exchange device 300. In some embodiments, the power level of the optical pump signal may be larger than the power of the optical input signal 310. The optical pump 312 may be coupled to the optical coupler 320 and may be configured to provide the optical pump signal to the optical coupler 320.

In some embodiments, the optical coupler 320 may device configured to multiplex optical signals. The optical coupler 320 be configured to receive the optical input signal 310 and the optical pump signal and to multiplex the optical input signal 310 and the optical pump signal. The optical coupler 320 may provide the multiplexed optical signals to the optical fiber 330.

In some embodiments, the optical fiber 330 may be a non-linear optical medium that may obtain the multiplexed optical signals from the optical coupler 320. Providing the multiplexed optical signals with wavelengths that are adjacent thereto to the non-linear optical medium of the optical fiber 330 may cause an idler signal to be generated. The wavelength of the idler signal may be associated with the wavelengths of the optical input signal 310 and the optical pump signal. In some embodiments, the wavelength of the idler signal may be expressed by the following equation: $\omega_{idler} = 2\omega_{pump} - \omega_{signal}$ where $\omega_{idler}$ is the frequency of the idler signal, $\omega_{pump}$ is the frequency of the optical pump signal and $\omega_{signal}$ is the frequency of the optical input signal 310.

When the idler signal is generated, additionally a sub-idler signal may be generated that is the same wavelength of the optical input signal 310. The sub-idler signal may have less power than the idler signal. The sub-idler signal may constructively interfere with the optical input signal 310 thereby increasing the gain of the optical input signal 310. Thus, the power of the sub-idler signal may be equal to the gain applied to the optical input signal 310. The process of the generation of the sub-idler signal and constructive interfere with the optical input signal 310 may be referred in this disclosure as wavelength exchange.

In some embodiments, the power of the sub-idler signal may be based on the power of the idler signal and the power of the idler signal may be based on the power of the optical pump signal. The power of the idler signal may be expressed by the following equation: $P_{idler} = K \times P_{Pump}^2 \times P_{signal}$, where $P_{idler}$ is the power of the idler signal, $P_{Pump}$ is the power of the optical pump signal, $P_{signal}$ is the power of the optical input signal 310, and K is a value that is based on the configuration of the wavelength exchange device 300 and the power of the optical pump signal. The value of K is further described with respect to FIG. 4. Modifications, additions, or omissions may be made to the wavelength exchange device 300 without departing from the scope of the present disclosure.

Figure 3B:
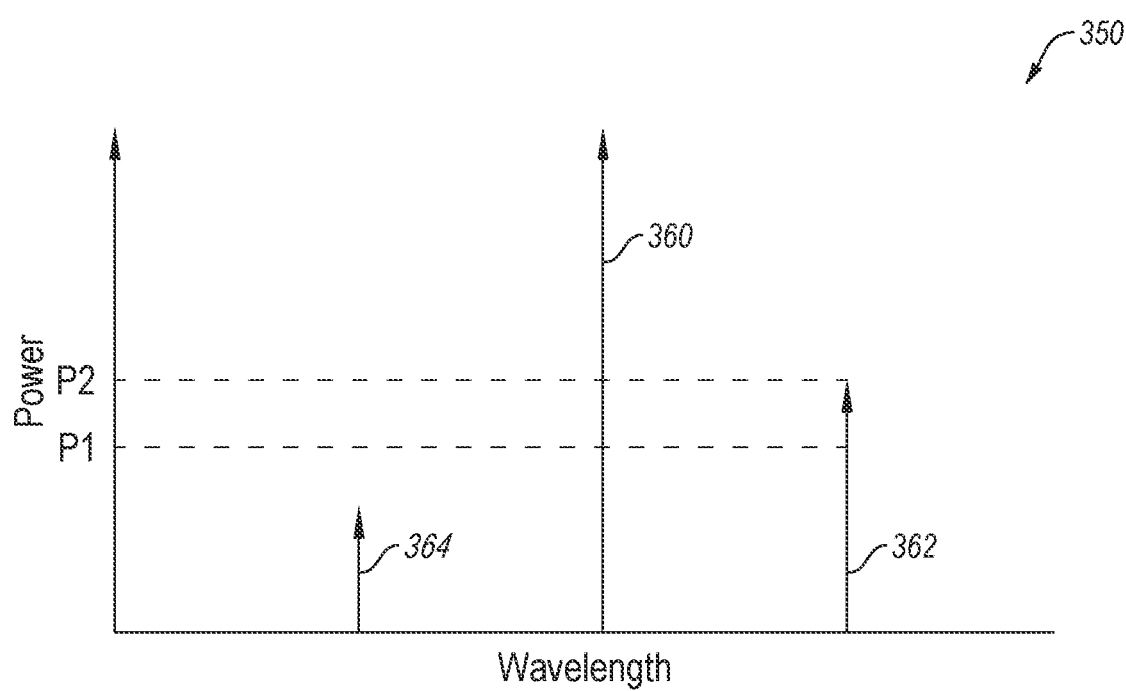
FIG. 3B illustrates a diagram of example signals in a wavelength exchange device.

FIG. 3B illustrates a diagram 350 of example signals in a wavelength exchange device, according to at least one embodiment in the present disclosure. The diagram 350 may include an axis associated with a wavelength and an axis associated with a power level of signals. The diagram 350 may further include an optical pump signal 360, an optical input signal 362, and an optical idler signal 364. As illustrated, the wavelengths of the optical pump signal 360, the optical input signal 362, and the optical idler signal 364 may have a relationship as described with respect to FIG. 3A.

In some embodiments, the optical pump signal 360 and the optical input signal 362 with a power level of P1 may be provided to an optical coupler, such as the optical coupler 320, and input to an optical fiber, such as the optical fiber 330, to generate the optical idler signal 364. The generation of the optical idler signal 364 may result in the generation of a sub-idler signal that may have the same wavelength of the optical input signal 362. The constructive interference of the sub-idler signal and the optical input signal 362 may result in the power level of the optical input signal 362 increasing to P2. The difference between the power levels P2 and P1 may represent the power level of the sub-idler signal. As illustrated, the power level of the sub-idler signal may be smaller than the power level of the optical pump signal 360, the optical idler signal 364, and the optical input signal 362. Note additionally, that the optical pump signal 360 may have a power level greater than the optical idler signal 364 and the optical input signal 362.

Figure 4:
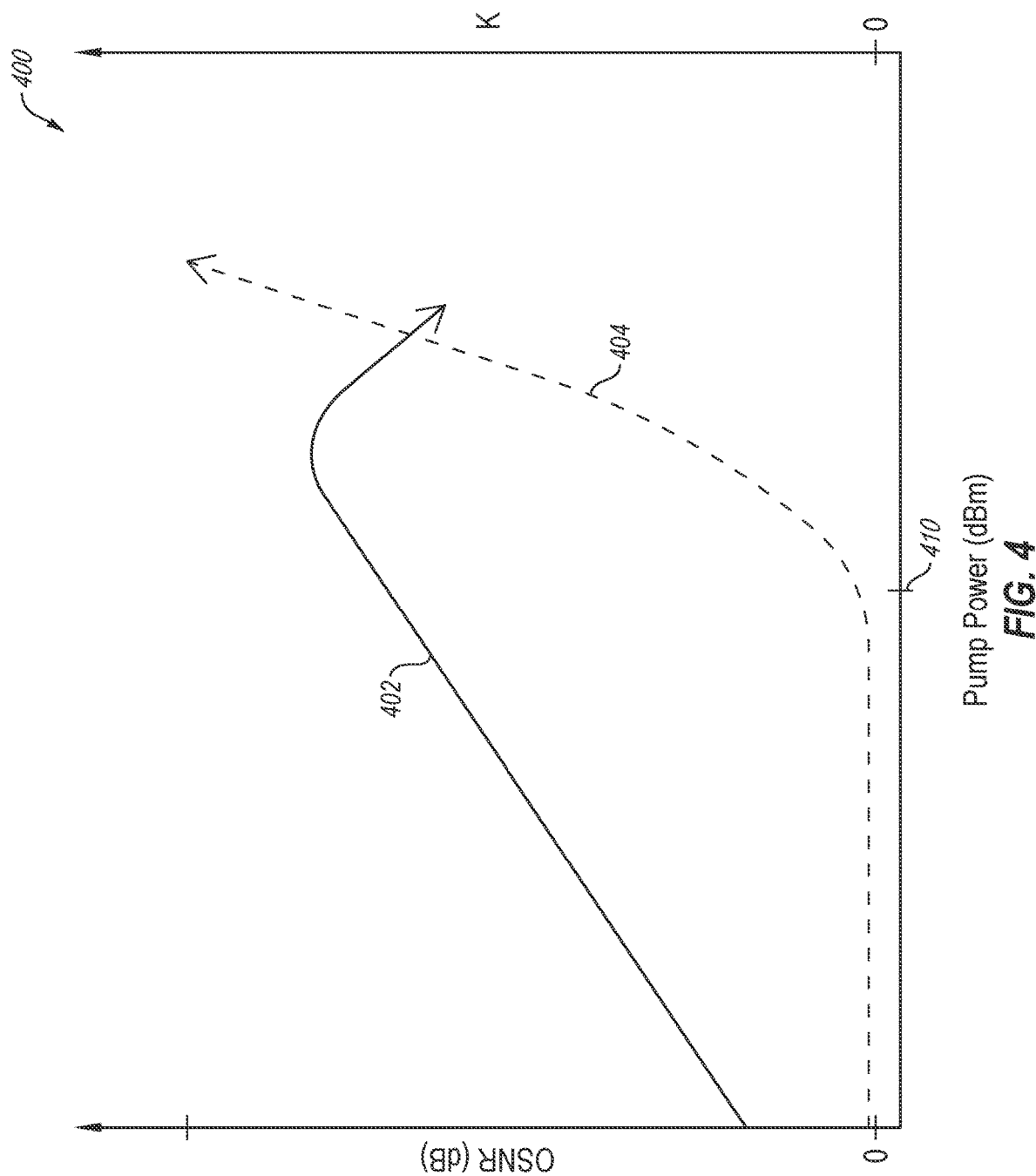
FIG. 4 illustrates a diagram of example OSNR levels of an optical idler signal in a wavelength exchange device.

FIG. 4 illustrates a diagram 400 of example OSNR levels of an idler signal in a wavelength exchange device, according to at least one embodiment in the present disclosure.

As described with respect to FIG. 3A, the power of the idler signal in the wavelength exchange device that is generated by an optical input signal and an optical pump signal may be expressed by the following equation: $P_{idler} = K \times P_{Pump}^2 \times P_{signal}$, where $P_{idler}$ is the power of the idler signal, $P_{Pump}$ is the power of the optical pump signal, $P_{signal}$ is the power of the optical input signal, and K is a value that is based on the configuration of the wavelength exchange device and the power of the optical pump signal.

The diagram 400 may include an axis associated with an OSNR of the idler signal that may represent a power/noise ratio of the idler signal, and an axis associated with a value of the variable K. The diagram 400 further illustrates a line 402 that represents an OSNR of an idler signal. The diagram 400 further illustrates a line 404 that represents a value of the variable K with respect to the pump power.

As illustrated, the value of K may be relatively low and a constant or near constant value for a pump power below a threshold pump power 410. In some embodiments, the threshold pump power 410 may be approximately equal to or equal to the power level of the optical input signal. When the pump power is below the threshold pump power 410, the signal power of the idler signal may be increased without amplified spontaneous emissions occurring. As a result, the signal power of the idler signal may increase without an increase or a very small increase in noise. Thus, the ONSR of the idler signal may increase with an increase in the pump power below the threshold pump power 410 as illustrated by the line 402.

When the pump power increases past the threshold pump power 410 the value of K may increase, amplified spontaneous emissions may start to occur, and optical parametric amplification of the idler signal may occur. The power of the idle signal may continue to increase as noted by the equation $P_{idler} = K \times P_{Pump}^2 \times P_{signal}$ by way of optical parametric amplification. In fact, the power of the idle signal may increase at an increasing rate as the value of K increases. However, noise due to amplified spontaneous emissions also increases as the pump power increase. As a result, the OSNR of the idler signal may begin to decrease as illustrated by the line 402 when the pump power is greater than the threshold pump power 410.

Selection of the pump power and thus the power of the optical pump signal may be selected to be below the threshold. Adjustment of the pump power may cause an adjustment in a power level of the idler signal and thus an adjustment in the sub-idler signal that may constructively interfere with the optical input signal. As such, the gain applied to the optical input signal may be adjusted by adjusting the pump power. Furthermore, to avoid introduction of non-negligible noise, e.g., noise greater than the −58 dBm, the pump power may be maintained below the threshold pump power 410.

Further, in some embodiments, the threshold pump power 410 may be at a level such that the power of the idler signal is approximately equal to the power of the optical input signal. As a result, in some embodiments, a power of the optical pumps signal may be selected so that a power of the idler signal satisfies a threshold. In these and other embodiments, the threshold may be selected based on the power of the optical input signal. For example, the threshold may be the power of the optical input signal and the idler signal may satisfy the threshold by being below than the threshold. Thus, the power of the optical pumps signal may be selected such that the power of the idler signal is less than the power of the optical input signal to avoid or reduce the introduction of non-negligible noise resulting from optical parametric amplification of the idler signal.

Figure 5:
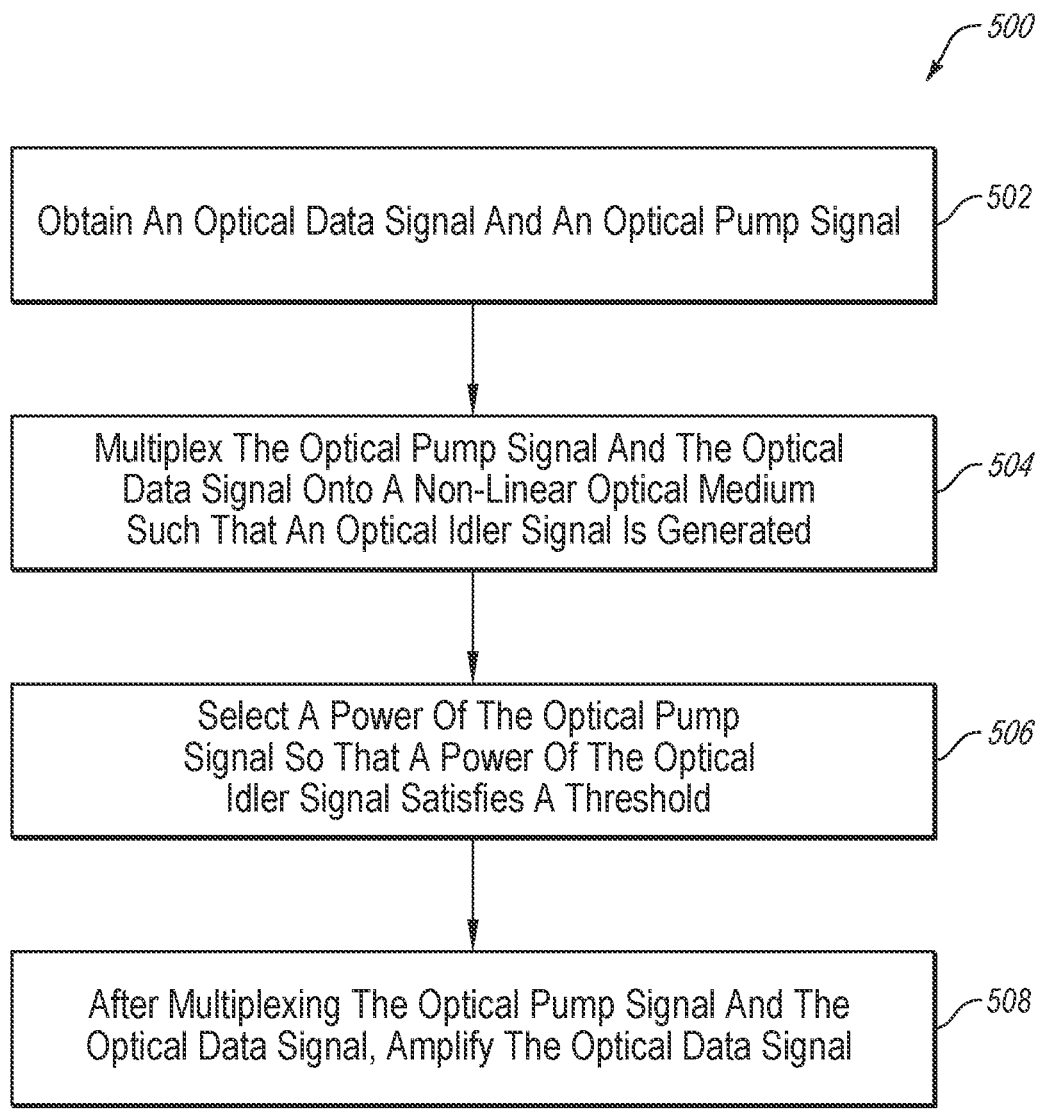
FIG. 5 illustrates a flowchart of an example method of optical signal power gain.

FIG. 5 illustrates a flowchart of an example method 500 of optical signal power gain. The method 500 may be arranged in accordance with at least one embodiment described in the present disclosure. One or more operations of the method 500 may be performed, in some embodiments, by a device or system, such as the optical network 100 of FIG. 1 or the optical gain system 200 of FIG. 2 or another device, combination of devices, system, or systems. In these and other embodiments, one or more of the steps or none of the steps of the method 500 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method may begin at block 502, where an optical data signal and an optical pump signal may be obtained. At block 504, the optical pump signal and the optical data signal may be multiplexed onto a non-linear optical medium such that an optical idler signal is generated.

At block 506, a power of the optical pump signal may be selected so that a power of the optical pump signal satisfies a threshold. In some embodiments, the threshold may be below a level that results in optical parametric amplification of the optical idler signal. Alternately or additionally, the threshold may be a power of the optical data signal.

At block 508, after multiplexing the optical pump signal and the optical data signal, the optical data signal may be amplified. In some embodiments, amplifying the optical data signal may be performed by an erbium-doped fiber amplifier configured for a wavelength of the optical data signal.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, the method 500 may further include before multiplexing the optical pump signal and the optical data signal, filtering a wavelength of the optical idler signal. Alternately or additionally, the method 500 may further include after multiplexing the optical pump signal and the optical data signal, generating a second optical pump signal and multiplexing the second optical pump signal and the optical data signal onto a non-linear second optical medium such that a second optical idler signal is generated. In these and other embodiments, a wavelength of the second optical pump signal and the optical pump signal may be the same. In this example, the method 500 may further include after multiplexing the optical pump signal and the optical data signal and before multiplexing the second optical pump signal and the optical data signal, filtering a wavelength of the optical idler signal.

As another example, the method 500 may further include after multiplexing the optical pump signal and the optical data signal onto the optical medium and before amplifying the optical data signal, filtering a wavelength of the optical idler signal. In this example, the method 500 may further include before multiplexing the optical pump signal and the optical data signal, filtering the wavelength of the optical idler signal.

Figure 6:
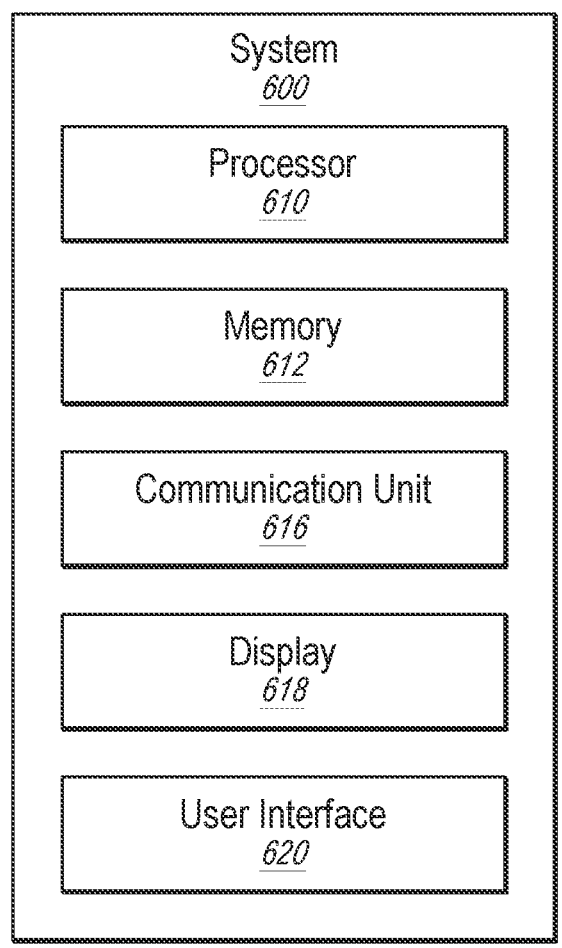
FIG. 6 illustrates an example system that may be used for optical signal power gain.

FIG. 6 is a block diagram illustrating an example system 600 that may be used for optical signal power gain, according to at least one embodiment of the present disclosure. The system 600 may include a processor 610, memory 612, a communication unit 616, a display 618, and a user interface unit 620, which all may be communicatively coupled. In some embodiments, the system 600 may be used to perform one or more of the methods described in this disclosure.

For example, the system 600 may be used to assist in the performance of the method described in FIG. 5. Alternately or additionally, the system 600 or parts of the system 600 may be part of the optical network 100 of FIG. 1. For example, the system 600 may be used to determine a power level of an optical pump.

Generally, the processor 610 may include any suitable special-purpose or general-purpose computer, computing entity, or processing device including various computer hardware or software modules and may be configured to execute instructions stored on any applicable computer-readable storage media. For example, the processor 610 may include a microprocessor, a microcontroller, a parallel processor such as a graphics processing unit (GPU) or tensor processing unit (TPU), a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 6, it is understood that the processor 610 may include any number of processors distributed across any number of networks or physical locations that are configured to perform individually or collectively any number of operations described herein. In some embodiments, the processor 610 may interpret and/or execute program instructions and/or process data stored in the memory 612. In some embodiments, the processor 610 may execute the program instructions stored in the memory 612.

For example, in some embodiments, the processor 610 may execute program instructions stored in the memory 612 that are related to task execution such that the system 600 may perform or direct the performance of the operations associated therewith as directed by the instructions. In these and other embodiments, the instructions may be used to perform one or more blocks of method 500 of FIG. 5.

The memory 612 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 610.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media.

Computer-executable instructions may include, for example, instructions and data configured to cause the processor 610 to perform a certain operation or group of operations as described in this disclosure. In these and other embodiments, the term "non-transitory" as explained in the present disclosure should be construed to exclude only those types of transitory media that were found to fall outside the scope of patentable subject matter in the Federal Circuit decision of In re Nuijten, 500 F.3d 1346 (Fed. Cir. 2007). Combinations of the above may also be included within the scope of computer-readable media.

The communication unit 616 may include any component, device, system, or combination thereof that is configured to transmit or receive information over a network. In some embodiments, the communication unit 616 may communicate with other devices at other locations, the same location, or even other components within the same system. For example, the communication unit 616 may include a modem, a network card (wireless or wired), an infrared communication device, a wireless communication device (such as an antenna), and/or chipset (such as a Bluetooth® device, an 802.6 device (e.g., Metropolitan Area Network (MAN)), a WiFi device, a WiMax device, cellular communication facilities, etc.), and/or the like. The communication unit 616 may permit data to be exchanged with a network and/or any other devices or systems described in the present disclosure.

The display 618 may be configured as one or more displays, like an LCD, LED, Braille terminal, or other type of display. The display 618 may be configured to present video, text captions, user interfaces, and other data as directed by the processor 610.

The user interface unit 620 may include any device to allow a user to interface with the system 600. For example, the user interface unit 620 may include a mouse, a track pad, a keyboard, buttons, camera, and/or a touchscreen, among other devices. The user interface unit 620 may receive input from a user and provide the input to the processor 610. In some embodiments, the user interface unit 620 and the display 618 may be combined.

Modifications, additions, or omissions may be made to the system 600 without departing from the scope of the present disclosure. For example, in some embodiments, the system 600 may include any number of other components that may not be explicitly illustrated or described. Further, depending on certain implementations, the system 600 may not include one or more of the components illustrated and described.

As indicated above, the embodiments described herein may include the use of a special purpose or general-purpose computer (e.g., the processor 610 of FIG. 6) including various computer hardware or software modules, as discussed in greater detail below. Further, as indicated above, embodiments described herein may be implemented using computer-readable media (e.g., the memory 612 of FIG. 6) for carrying or having computer-executable instructions or data structures stored thereon.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method comprising:
   obtaining an optical data signal and an optical pump signal;
   multiplexing the optical pump signal and the optical data signal onto a non-linear optical medium such that an optical idler signal is generated;
   selecting a power of the optical pump signal so that a power of the optical idler signal satisfies a threshold; and
   after multiplexing the optical pump signal and the optical data signal, amplifying the optical data signal.

2. The method of claim 1, further comprising before multiplexing the optical pump signal and the optical data signal, filtering a wavelength of the optical idler signal.

3. The method of claim 1, wherein the amplifying the optical data signal is performed by an erbium-doped fiber amplifier configured for a wavelength of the optical data signal.

4. The method of claim 1, further comprising:
   after multiplexing the optical pump signal and the optical data signal:
   generating a second optical pump signal; and
   multiplexing the second optical pump signal and the optical data signal onto a non-linear second optical medium such that a second optical idler signal is generated.

5. The method of claim 4, wherein a wavelength of the second optical pump signal and the optical pump signal are the same.

6. The method of claim 4, further comprising after multiplexing the optical pump signal and the optical data signal and before multiplexing the second optical pump signal and the optical data signal, filtering a wavelength of the optical idler signal.

7. The method of claim 1, wherein the threshold is below a level that results in optical parametric amplification of the optical idler signal.

8. The method of claim 1, wherein the threshold is based on a power of the optical data signal.

9. The method of claim 1, further comprising after multiplexing the optical pump signal and the optical data signal onto the optical medium and before amplifying the optical data signal, filtering a wavelength of the optical idler signal.

10. The method of claim 9, further comprising before multiplexing the optical pump signal and the optical data signal, filtering the wavelength of the optical idler signal.

11. An optical device comprising:
    a non-linear optical medium;
    an optical coupler coupled to the optical medium and configured to multiplex an optical data signal and an optical pump signal onto the optical medium such that an optical idler signal is generated and a power of the optical pump signal is below a level that results in optical parametric amplification of the optical idler signal; and
    an amplifier coupled to the optical medium and configured to amplify the optical data signal.

12. The optical device of claim 11, further comprising a filter coupled to the optical coupler and configured to provide the optical data signal to the optical coupler and to filter at a wavelength of the optical idler signal.

13. The optical device of claim 11, further comprising a filter coupled between the optical medium and the amplifier, the filter configured to filter at a wavelength of the optical idler signal.

14. The optical device of claim 13, further comprising a second filter coupled to the optical coupler and configured to provide the optical data signal to the optical coupler and to filter at a wavelength of the optical idler signal.

15. The optical device of claim 11, further comprising an optical pump coupled to the optical coupler, the optical pump configured to generate the optical pump signal at the power below the level that results in optical parametric amplification of the optical idler signal.

16. The optical device of claim 11, further comprising
a non-linear second optical medium coupled between the optical medium and the amplifier; and
a second optical coupler coupled between the optical medium and the second optical medium and configured to multiplex the optical data signal and a second optical pump signal onto the second optical medium such that a second optical idler signal is generated and a power of the second optical pump signal is below a level that results in optical parametric amplification of the second optical idler signal.

17. The optical device of claim 16, wherein a wavelength of the second optical pump signal and the optical pump signal are the same.

18. The optical device of claim 16, further comprising a filter between the optical medium and the second optical coupler, the filter configured to filter at a wavelength of the optical idler signal.

19. The optical device of claim 11, wherein the level that results in optical parametric amplification of the optical idler signal is a power of the optical data signal.

20. The optical device of claim 11, wherein the amplifier is an erbium-doped fiber amplifier configured for a wavelength of the optical data signal.

* * * * *